United States Patent
Murasaki et al.

(10) Patent No.: US 11,989,929 B2
(45) Date of Patent: May 21, 2024

(54) IMAGE CLASSIFIER LEARNING DEVICE, IMAGE CLASSIFIER LEARNING METHOD, AND PROGRAM

(71) Applicant: NIPPON TELEGRAPH AND TELEPHONE CORPORATION, Tokyo (JP)

(72) Inventors: Kazuhiko Murasaki, Tokyo (JP); Shingo Ando, Tokyo (JP); Atsushi Sagata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 564 days.

(21) Appl. No.: 17/277,248

(22) PCT Filed: Sep. 6, 2019

(86) PCT No.: PCT/JP2019/035215
§ 371 (c)(1),
(2) Date: Mar. 17, 2021

(87) PCT Pub. No.: WO2020/059545
PCT Pub. Date: Mar. 26, 2020

(65) Prior Publication Data
US 2021/0357698 A1 Nov. 18, 2021

(30) Foreign Application Priority Data
Sep. 20, 2018 (JP) .................................. 2018-176051

(51) Int. Cl.
*G06V 10/774* (2022.01)
*G06F 18/214* (2023.01)
(Continued)

(52) U.S. Cl.
CPC ...... *G06V 10/7753* (2022.01); *G06F 18/2155* (2023.01); *G06F 18/22* (2023.01); *G06V 10/82* (2022.01)

(58) Field of Classification Search
CPC .......... G06N 20/00; G06T 7/00; G06F 18/22; G06F 18/2155; G06V 10/82; G06V 10/7753
See application file for complete search history.

(56) References Cited

PUBLICATIONS

Chen Y, Pont-Tuset J, Montes A, Van Gool L. Blazingly Fast Video Object Segmentation with Pixel-Wise Metric Learning. arXiv preprint arXiv:1804.03131. Apr. 9, 2018. (Year: 2018).*

(Continued)

*Primary Examiner* — Vu Le
*Assistant Examiner* — Tracy Mangialaschi

(57) ABSTRACT

An object is to make it possible to train an image recognizer by efficiently using training data that does not include label information. A determination unit 180 causes repeated execution of the followings. A feature representation model for extracting feature vectors of pixels is trained such that an objective function is minimized, the objective function being expressed as a function that includes a value that is based on a difference between a distance between feature vectors of pixels labeled with a positive example label and a distance between a feature vector of a pixel labeled with the positive example label and a feature vector of an unlabeled pixel, and a value that is based on a difference between a distance between a feature vector of a pixel labeled with the positive example label and a feature vector of an unlabeled pixel and a distance between a feature vector of a pixel labeled with the positive example label and a feature vector of a pixel labeled with a negative example label, and based on a distribution of feature vectors corresponding to the positive example label, a predetermined number of labels are given based on the likelihood that each unlabeled pixel is a positive example.

12 Claims, 3 Drawing Sheets

(51) Int. Cl.
   *G06F 18/22*   (2023.01)
   *G06V 10/82*   (2022.01)

(56) References Cited

PUBLICATIONS

Harwood, Ben, et al. "Smart Mining for Deep Metric Learning." 2017 IEEE International Conference on Computer Vision (ICCV). IEEE, 2017. (Year: 2017).*
Lin et al. (2016) "ScribbleSup: Scribble-Supervised Convolutional Networks for Semantic Segmentation," CVPR Paper, The Chinese University of Hong Kong, Microsoft Research, 9 pages.

* cited by examiner

IMAGE CLASSIFIER LEARNING DEVICE, IMAGE CLASSIFIER LEARNING METHOD, AND PROGRAM

CROSS-REFERENCE TO RELATED APPLICATIONS

This application is a U.S. 371 Application of International Patent Application No. PCT/JP2019/035215, filed on 6 Sep. 2019, which application claims priority to and the benefit of JP Application No. 2018-176051, filed on 20 Sep. 2018, the disclosures of which are hereby incorporated herein by reference in their entireties.

TECHNICAL FIELD

The present invention relates to an image recognizer training device, an image recognizer training method, and a program, and particularly to an image recognizer training device, an image recognizer training method, and a program for efficiently training an image recognizer.

BACKGROUND ART

Many recognition methods have been proposed that can accurately extract a target region from an image by using a machine learning method such as deep learning if sufficient training data is available.

On the other hand, there is a problem in that if sufficient training data is not available, over-fitting to some data occurs and the accuracy of recognition cannot be enhanced. For example, NPL 1 proposes a method for training a high accuracy region extractor by performing pseudo label estimation for pixels for which labels are unknown, with respect to a set of images in which labels used for training are given only to some pixels of the images.

CITATION LIST

Non Patent Literature

[NPL 1] Lin et al., "ScribbleSup: Scribble-Supervised Convolutional Networks for Semantic Segmentation", CVPR 2016.

SUMMARY OF THE INVENTION

Technical Problem

However, the method proposed in NPL 1 takes an approach of propagating labels to pixels for which labels are unknown and that are located around labeled pixels, based on information regarding contours in an image and scores of a recognizer trained using some labels, but this approach has a problem in that appropriate pseudo labels can be given to a region only when the same label is given to a surrounding area of the region, and accordingly, for example, an image to which no label is given cannot be handled as a target of pseudo labeling.

Also, there is a problem in that the recognizer trained using some labels is trained using a small number of samples, and therefore the risk of over-fitting is high.

The present invention was made in view of the foregoing, and it is an object of the present invention to provide an image recognizer training device, an image recognizer training method, and a program that can train an image recognizer by efficiently using training data that does not include label information.

Means for Solving the Problem

An image recognizer training device according to the present invention includes: a representation learning unit configured to train a feature representation model based on a set of images that include an image including pixels each labeled with a positive example label or a negative example label and an image including unlabeled pixels, the feature representation model being a model for extracting feature vectors of the pixels and trained such that an objective function is minimized, the objective function being expressed as a function that includes a value that is based on a difference between a distance between feature vectors of pixels labeled with the positive example label and a distance between a feature vector of a pixel labeled with the positive example label and a feature vector of an unlabeled pixel, and a value that is based on a difference between a distance between a feature vector of a pixel labeled with the positive example label and a feature vector of an unlabeled pixel and a distance between a feature vector of a pixel labeled with the positive example label and a feature vector of a pixel labeled with the negative example label; a feature value extraction unit configured to extract feature vectors of a plurality of pixels included in the images based on the feature representation model trained by the representation learning unit; a positive example distribution estimation unit configured to estimate a distribution of feature vectors that are extracted by the feature value extraction unit with respect to pixels labeled with the positive example label; a pseudo label giving unit configured to calculate, with respect to each unlabeled pixel, the likelihood that the pixel is a positive example based on the distribution estimated by the positive example distribution estimation unit and give the positive example label to pixels, the number of which is a first sample number determined in advance, in descending order of the likelihood and give the negative example label to pixels, the number of which is a second sample number determined in advance, in ascending order of the likelihood; and a determination unit configured to determine whether or not there is an unlabeled pixel among pixels of the images, and if there is an unlabeled pixel, causes repeated execution of training performed by the representation learning unit, extraction of feature vectors performed by the feature value extraction unit, estimation performed by the positive example distribution estimation unit, and labeling performed by the pseudo label giving unit.

An image recognizer training method according to the present invention includes: training, by a representation learning unit, a feature representation model based on a set of images that include an image including pixels each labeled with a positive example label or a negative example label and an image including unlabeled pixels, the feature representation model being a model for extracting feature vectors of the pixels and trained such that an objective function is minimized, the objective function being expressed as a function that includes a value that is based on a difference between a distance between feature vectors of pixels labeled with the positive example label and a distance between a feature vector of a pixel labeled with the positive example label and a feature vector of an unlabeled pixel, and a value that is based on a difference between a distance between a feature vector of a pixel labeled with the positive example label and a feature vector of an unlabeled pixel and a distance between a feature vector of a pixel labeled with the positive example label and a feature vector of a pixel labeled with the negative example label; extracting, by a feature value extraction unit, feature vectors of a plurality of pixels included in the images based on the feature representation model trained by the representation learning unit; estimating, by a positive example distribution estimation unit, a distribution of feature vectors that are extracted by the feature value extraction unit with respect to pixels labeled with the positive example label; calculating, by a pseudo label giving unit, with respect to each unlabeled pixel, the likelihood that the pixel is a positive example based on the distribution estimated by the positive example distribution estimation unit, and giving the positive example label to pixels, the number of which is a first sample number determined in advance, in descending order of the likelihood and giving the negative example label to pixels, the number of which is a second sample number determined in advance, in ascending order of the likelihood; and determining, by a determination unit, whether or not there is an unlabeled pixel among pixels of the images, and if there is an unlabeled pixel, causing repeated execution of training performed by the representation learning unit, extraction of feature vectors performed by the feature value extraction unit, estimation performed by the positive example distribution estimation unit, and labeling performed by the pseudo label giving unit.

According to the image recognizer training device and the image recognizer training method of the present invention, the representation learning unit trains a feature representation model based on a set of images that include an image including pixels each labeled with a positive example label or a negative example label and an image including unlabeled pixels, the feature representation model being a model for extracting feature vectors of the pixels and trained such that an objective function is minimized, the objective function being expressed as a function that includes a value that is based on a difference between a distance between feature vectors of pixels labeled with the positive example label and a distance between a feature vector of a pixel labeled with the positive example label and a feature vector of an unlabeled pixel, and a value that is based on a difference between a distance between a feature vector of a pixel labeled with the positive example label and a feature vector of an unlabeled pixel and a distance between a feature vector of a pixel labeled with the positive example label and a feature vector of a pixel labeled with the negative example label.

The feature value extraction unit extracts feature vectors of a plurality of pixels included in the images based on the feature representation model trained by the representation learning unit, the positive example distribution estimation unit estimates a distribution of feature vectors that are extracted by the feature value extraction unit with respect to pixels labeled with the positive example label, and the pseudo label giving unit calculates, with respect to each unlabeled pixel, the likelihood that the pixel is a positive example based on the distribution estimated by the positive example distribution estimation unit, and gives the positive example label to pixels, the number of which is a first sample number determined in advance, in descending order of the likelihood, and gives the negative example label to pixels, the number of which is a second sample number determined in advance, in ascending order of the likelihood.

Then, the determination unit determines whether or not there is an unlabeled pixel among pixels of the images, and if there is an unlabeled pixel, causes repeated execution of training performed by the representation learning unit, extraction of feature vectors performed by the feature value extraction unit, estimation performed by the positive example distribution estimation unit, and labeling performed by the pseudo label giving unit.

As described above, it is possible to train an image recognizer by efficiently using training data that does not include label information by repeatedly performing the followings. If there are unlabeled pixels among pixels of an image, a feature representation model is trained based on a set of images that include an image including pixels each labeled with a positive example label or a negative example label and an image including unlabeled pixels. The feature representation model is a model for extracting feature vectors of the pixels and is trained such that an objective function is minimized. The objective function is expressed as a function that includes a value that is based on a difference between a distance between feature vectors of pixels labeled with the positive example label and a distance between a feature vector of a pixel labeled with the positive example label and a feature vector of an unlabeled pixel, and a value that is based on a difference between a distance between a feature vector of a pixel labeled with the positive example label and a feature vector of an unlabeled pixel and a distance between a feature vector of a pixel labeled with the positive example label and a feature vector of a pixel labeled with the negative example label. With respect to each unlabeled pixel, the likelihood that the pixel is a positive example is calculated based on a distribution of feature vectors of pixels labeled with the positive example label, the feature vectors being extracted with respect to a plurality of pixels included in the images. The positive example label is given to pixels, the number of which is a first sample number determined in advance, in descending order of the likelihood, and the negative example label is given to pixels, the number of which is a second sample number determined in advance, in ascending order of the likelihood.

The objective function of the image recognizer training device according to the present invention can be expressed as a function that further includes a value that is based on a difference between a distance between feature vectors of pixels labeled with the same label and a distance between feature vectors of pixels labeled with different labels.

A program according to the present invention is a program for causing a computer to function as each unit of the above-described image recognizer training device.

Effects of the Invention

According to the image recognizer training device, the image recognizer training method, and the program of the present invention, it is possible to train an image recognizer by efficiently using training data that does not include label information.

DESCRIPTION OF EMBODIMENTS

The following describes an embodiment of the present invention using the drawings.

<Summary of Image Recognizer Training Device According to Embodiment of the Invention>

First, a summary of the embodiment of the present invention will be described.

The embodiment of the present invention realizes a method for training an image recognizer that accurately extracts a target region, based on training data in which only some pixels of images are labeled. In particular, the embodiment realizes a method for efficiently using images to which no label is given even if those images are included in training data.

To solve the above-described problems, pseudo labeling needs to be performed to use unlabeled pixels in training.

In the embodiment of the present invention, with respect to each of pixels for which labels are unknown, the likelihood that the pixel belongs to each label is calculated, and pseudo labels are gradually given, starting from pixels having high reliability. To calculate the likelihood, representation learning is performed to find a feature representation that makes a distance between pixels of the same label short.

To obtain an appropriate feature representation through representation learning, an objective function that also adopts pixels for which labels are unknown as training samples is introduced. Thus, the diversity of training samples can be ensured and over-fitting can be suppressed.

Then, a distribution to which each label belongs is estimated based on the learned representation, and with respect to each of pixels for which labels are unknown, the likelihood that the pixel belongs to the label is calculated. Pixels for which the calculated likelihood is high are selected and labeled with a corresponding pseudo label.

Thus, labels are successively given to pixels for which labels are unknown by repeating optimization of the feature representation through representation learning and pseudo labeling based on the feature representation.

An image recognizer that extracts a target region can be obtained by training the recognizer based on finally obtained training data in which all pixels are labeled.

With this configuration, it is possible to train an image recognizer by efficiently using training data that does not include label information regarding the target region.

For example, in a task of detecting deteriorated portions from images obtained by capturing infrastructure equipment, even if there are many captured images, it is often difficult to label each pixel regarding detailed shapes of deteriorated portions. Also, overlooking may occur in labeling.

In such cases, if pseudo labels are given to unlabeled data as well based on some reliable label information, it is possible to train a high accuracy image recognizer.

<Configuration of Image Recognizer Training Device According to Embodiment of the Invention>

Figure 1:
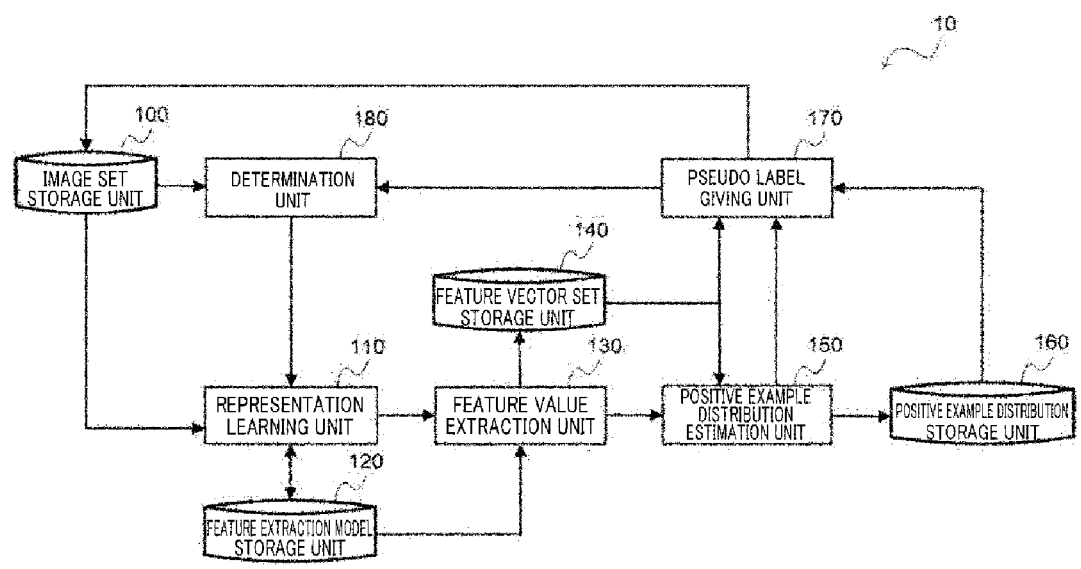
FIG. 1 is a block diagram showing a configuration of an image recognizer training device according to an embodiment of the present invention.

A configuration of an image recognizer training device 10 according to the embodiment of the present invention will be described with reference to FIG. 1. FIG. 1 is a block diagram showing the configuration of the image recognizer training device 10 according to the embodiment of the present invention.

The image recognizer training device 10 is constituted by a computer that includes a CPU, a RAM, and a ROM in which a program for executing an image recognizer training processing routine, which will be described later, is stored, and is functionally configured as described below.

As shown in FIG. 1, the image recognizer training device 10 according to the present embodiment includes an image set storage unit 100, a representation learning unit 110, a feature extraction model storage unit 120, a feature value extraction unit 130, a feature vector set storage unit 140, a positive example distribution estimation unit 150, a positive example distribution storage unit 160, a pseudo label giving unit 170, and a determination unit 180.

A set of images that include an image including pixels each labeled with a positive example label or a negative example label and an image including unlabeled pixels is stored in the image set storage unit 100, and three types of label data indicating the positive example label, the negative example label, and unknown (unlabeled) are associated with pixels of each image of the set of images.

In the present embodiment, a problem of extracting one target region from an image is assumed for the sake of simplicity, and labels that are given indicate either a positive example (belonging to the target region) or a negative example (not belonging to the target region).

Figure 2:
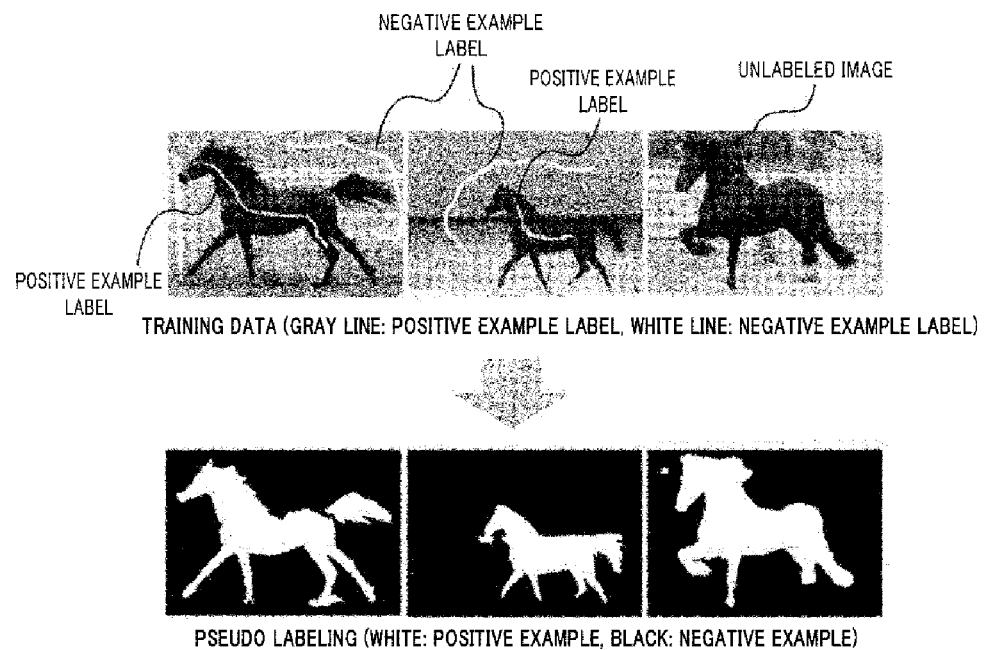
FIG. 2 is an image diagram showing one example of a set of images according to an embodiment of the present invention.

FIG. 2 is an image diagram showing one example of the set of images. In this example, in a problem of extracting a horse region from an image, a recognizer that accurately extracts the horse region is trained by using images (left and middle images in the upper row in FIG. 2) in which some pixels that are included in the horse region and some pixels that are not included in the horse region are labeled and an image (right image in the upper row in FIG. 2) to which no label is given.

Specifically, the image set storage unit 100 stores the set of images while associating the three types of label data indicating the positive example label, the negative example label, and unknown (unlabeled) with pixels of each image of the set of images shown in the upper row in FIG. 2.

The representation learning unit 110 trains a feature representation model for extracting feature vectors of the pixels such that an objective function that includes the following values is minimized. The values are based on the set of images that include images including pixels each labeled with the positive example label or the negative example label and an image including unlabeled pixels. A first value of the values is based on a difference between a distance between feature vectors of pixels labeled with the positive example label and a distance between a feature vector of a pixel labeled with the positive example label and a feature vector of an unlabeled pixel. A second value of the values is based on a difference between a distance between a feature vector of a pixel labeled with the positive example label and a feature vector of an unlabeled pixel and a distance between a feature vector of a pixel labeled with the positive example label and a feature vector of a pixel labeled with the negative example label.

The objective function is expressed as a function that further includes a value that is based on a difference between a distance between feature vectors of pixels labeled with the same label and a distance between feature vectors of pixels labeled with different labels.

Specifically, the representation learning unit 110 first acquires the set of images that include images including pixels each labeled with the positive example label or the negative example label and an image including unlabeled pixels from the image set storage unit 100. Also, the representation learning unit 110 acquires a feature representation model that is stored in the feature extraction model storage unit 120.

Next, with respect to each image of the set of images, the representation learning unit 110 trains the feature extraction model by using the three types of label data that are associated with pixels included in the image and indicate a positive example, a negative example, and unknown such that the distance between a positive example and a negative example is increased.

Here, in the present embodiment, it is assumed that a convolutional neural network is used as the feature extraction model to be trained, but any model can be used so long as appropriate training can be performed with respect to the objective function.

<<Setting of Objective Function>>

When a feature vector of a pixel x that is obtained using the trained feature extraction model is represented by f(x), the representation learning unit 110 trains the feature extraction model with respect to positive example pixels P={$p_1$, $p_2$, ... } and negative example pixels N={$n_1$, $n_2$, ... } to make the distance between f($p_i$) and f($p_j$) short and make the distance between f($p_i$) and f($n_j$) long.

An objective function for performing this optimization is proposed as Triplet Loss in Reference Document 1, and is expressed by a mathematical expression such as the following Expression (1).

[Reference Document 1] Hoffer and Ailon, "Deep metric learning using triplet network", International Workshop on Similarity-Based Pattern Recognition 2015.

[Formula 1]

$$L_{tri} = \max(\|f(P_a) - f(p_i)\|^2 - \|f(p_a) - f(n_j)\|^2 + \alpha, 0) \quad (1)$$

Here, $\alpha$ is a hyper-parameter that is determined in advance and is a value that controls how far a positive example and a negative example are distanced from each other.

In the above Expression (1), $p_a$ that serves as the center in comparison of distances is called an anchor, and the training proceeds such that a feature vector of the same class as the anchor becomes close to the anchor and a feature vector of a different class becomes distant from the anchor.

This objective function needs to be calculated for all samples, and objective functions for all samples are collectively expressed as an objective function $L_{PN}$ by the following Expression (3).

[Formula 2]

$$L_{tri}(a,p,n) = \max(\|f(a) - f(p)\|^2 - \|f(a) - f(n)\|^2 + \alpha, 0) \quad (2)$$

$$L_{PN} = \mathbb{E}_{a \in P} \mathbb{E}_{p \in P_a} \mathbb{E}_{n \in N} L_{tri}(a,p,n) \quad (3)$$

Here, $\mathbb{E}$ represents an average value of all corresponding elements. Since all positive example samples can be taken to be anchors, the objective function to be minimized is an average value of $L_{tri}$ for all combinations of positive example and negative example in cases where all positive example samples are taken to be anchors. Also, $L_{tri}(a,p,n)$ is one example of a value that is based on a difference between a distance between feature vectors of pixels labeled with the same label and a distance between a feature vector of a pixel labeled with a different label and a feature vector of an unlabeled pixel.

In the present embodiment, an objective function of a case where pixels for which labels are unknown are taken into consideration in this Triplet Loss is set.

Here, it is assumed that pixels for which labels are unknown actually belong to either positive examples or negative examples. Also, the proportion of positive examples included in pixels for which labels are unknown is represented by $\theta_p$, the proportion of negative examples included in those pixels is represented by $\theta_n$, and a set of the pixels for which labels are unknown is represented by U. These proportions are determined in advance for each type of target region, and values that are statistically obtained from images representing the type are used, for example.

Also, it is assumed that features of positive example pixels and negative example pixels included in the pixels for which labels are unknown are randomly obtained from the same distribution as labeled positive example pixels and labeled negative example pixels.

At this time, when a set P of known positive examples is taken to be the anchor, Triplet Loss that maximizes a distance to U is expressed by the following Expression (4).

[Formula 3]

$$\begin{aligned}L_{PU} &= \mathbb{E}_{a \in P} \mathbb{E}_{p \in P_a} \mathbb{E}_{u \in U} L_{tri}(a, p, u) \\ &= \mathbb{E}_{a \in P} \mathbb{E}_{p \in P_a} \begin{pmatrix} \theta_p \mathbb{E}_{p' \in U_P} L_{tri}(a, p, p') + \\ \theta_n \mathbb{E}_{n' \in U_N} L_{tri}(a, p, n') \end{pmatrix} \\ &= \theta_p \alpha + \theta_n L_{PN}\end{aligned} \quad (4)$$

Here, in the above Expression (4), $U_P$ represents positive example pixels included in U and $U_N$ represents negative example pixels included in U. Since it is assumed that P and $U_P$ are obtained from the same distribution, an average value of $L_{tri}(a,p,p')$ that compares distances from the anchor is a, and an average value of $L_{tri}(a,p,n')$ is the same as the original objective function $L_{PN}$. Also, $L_{tri}(a,p,u)$ is one example of a value that is based on a difference between a distance between feature vectors of pixels labeled with the positive example label and a distance between a feature vector of a pixel labeled with the positive example label and a feature vector of an unlabeled pixel.

Similarly, when the set P of known positive examples is taken to be the anchor, Triplet Loss that reduces a distance to U and increases a distance to N is expressed by the following Expression (5).

[Formula 4]

$$\begin{aligned}L_{UN} &= \mathbb{E}_{a \in P} \mathbb{E}_{u \in U} \mathbb{E}_{n \in N} L_{tri}(a, u, n) \\ &= \mathbb{E}_{a \in P} \mathbb{E}_{n \in N} \begin{pmatrix} \theta_p \mathbb{E}_{p' \in U_P} L_{tri}(a, p', n) + \\ \theta_n \mathbb{E}_{n' \in U_N} L_{tri}(a, n', n) \end{pmatrix} \\ &= \theta_p L_{PN} + \theta_n \alpha\end{aligned} \quad (5)$$

$L_{tri}(a,u,n)$ is one example of a value that is based on a difference between a distance between a feature vector of a pixel labeled with the positive example label and a feature vector of an unlabeled pixel and a distance between a feature vector of a pixel labeled with the positive example label and a feature vector of a pixel labeled with the negative example label.

By combining the above Expressions (4) and (5), the following Expression (6) is obtained.

[Formula 5]

$$L_{PN} = L_{PU} + L_{UN} - \alpha \quad (6)$$

That is, it can be understood that if the assumptions regarding the data U hold, the objective function $L_{PN}$ to be obtained can be obtained from $L_{PU}$ and $L_{UN}$ that are based on pixels for which labels are unknown. That is, $L_{PN}$, which is the direct objective function of a case where all labels are known, can be expressed using $L_{PU}$ and $L_{UN}$ that are based on pixels for which labels are unknown.

This is an effective method in a case where a sufficiently large amount of data U for which labels are unknown is available when compared to data P and N to which labels are given.

In the present embodiment, the direct objective function $L_{PN}$ and the above Expression (6) ($L_{PU}+L_{UN}-\alpha$) with which the number of training samples can be increased are used in combination.

An objective function that is finally minimized by the representation learning unit 110 is expressed by the following Expression (7).

[Formula 6]

$$L_{PNU}=\gamma L_{PN}+(1-\gamma)(L_{PU}+L_{UN}-\alpha) \quad (7)$$

Here, $\gamma$ is a value ($0<\gamma<1$) that is determined in advance and is a parameter for adjusting the direct objective function $L_{PN}$ and the above Expression (6) ($L_{PU}+L_{UN}-\alpha$) with which the number of training samples can be increased. That is, as a result of the objective function of the above Expression (7) being used, training data that does not include label information can be used in training of the image recognizer, the objective function of Expression (7) being the sum of a weighted value of the original objective function $L_{PN}$ of a case where all labels are known and a weighted value of the objective function $L_{PN}$ that can be expressed using $L_{PU}$ and $L_{UN}$ that are based on pixels for which labels are unknown.

The representation learning unit 110 trains the feature extraction model through error backpropagation by using stochastic gradient descent or the like, while taking the above Expression (7) to be the objective function.

Then, the representation learning unit 110 stores the trained feature extraction model in the feature extraction model storage unit 120 and gives the feature extraction model to the feature value extraction unit 130.

The feature representation model trained by the representation learning unit 110 is stored in the feature extraction model storage unit 120.

The feature value extraction unit 130 extracts feature vectors of a plurality of pixels included in the images based on the feature representation model trained by the representation learning unit 110.

Specifically, the feature value extraction unit 130 applies the trained feature extraction model to each pixel of the images to extract the feature vectors of the plurality of pixels included in the images.

Then, the feature value extraction unit 130 stores the extracted feature vectors of the plurality of pixels included in the images in the feature vector set storage unit 140, and gives the feature vectors to the positive example distribution estimation unit 150.

The feature vectors of the pixels extracted by the feature value extraction unit 130 are stored in the feature vector set storage unit 140.

The positive example distribution estimation unit 150 estimates a distribution of feature vectors that are extracted by the feature value extraction unit 130 with respect to pixels labeled with the positive example label.

Specifically, the positive example distribution estimation unit 150 collects feature vectors that are extracted by the feature value extraction unit 130 with respect to pixels labeled with the positive example label and fits a normal distribution.

The positive example distribution estimation unit 150 estimates the normal distribution by finding an average value $\mu_P$ and a covariance matrix $\Sigma_P$ of the feature vectors associated with the positive example label.

Then, the positive example distribution estimation unit 150 stores the estimated average value $\mu_P$ and the estimated covariance matrix $\Sigma_P$ in the positive example distribution storage unit 160 and gives the average value and the covariance matrix to the pseudo label giving unit 170.

The normal distribution (average value $\mu_P$ and covariance matrix $\Sigma_P$) estimated by the positive example distribution estimation unit 150 is stored in the positive example distribution storage unit 160.

The pseudo label giving unit 170 calculates, with respect to each unlabeled pixel, the likelihood that the pixel is a positive example based on the normal distribution (average value $\mu_P$ and covariance matrix $\Sigma_P$) estimated by the positive example distribution estimation unit 150 and the feature vector of the unlabeled pixel. Furthermore, the pseudo label giving unit 170 gives the positive example label to pixels, the number of which is a first sample number determined in advance, in descending order of the likelihood and gives the negative example label to pixels, the number of which is a second sample number determined in advance, in ascending order of the likelihood.

Specifically, based on the estimated normal distribution, the pseudo label giving unit 170 calculates the likelihood with respect to a feature vector u of each unlabeled pixel as shown in the following Expression (8), and gives the positive example label, starting from samples having high likelihood, and gives the negative example label, starting from samples having low likelihood.

[Formula 7]

$$P(u|\mu_p, \Sigma_p) = \frac{1}{(\sqrt{2\pi})^d \sqrt{|\Sigma_p|}} \exp\left(-\frac{1}{2}(u-\mu_p)^T \Sigma_p^{-1}(u-\mu_p)\right) \quad (8)$$

Here, d represents the number of dimensions of the feature vector.

Two hyper-parameters are set in advance with respect to the number of samples that are newly labeled. The number of samples that are labeled on a single occasion of updating is set to $\beta$, and proportions of positive examples and negative examples included in the $\beta$ samples are set to $\theta_P$ and $\theta_N$, respectively. That is, the first sample number representing the number of samples labeled with the positive example label is $\beta \times \theta_P$ and the second sample number representing the number of samples labeled with the negative example label is $\beta \times \theta_N$.

Then, the pseudo label giving unit 170 updates labels with respect to unlabeled pixels stored in the image set storage unit 100.

Also, the pseudo label giving unit 170 informs the determination unit 180 that the labels are given.

The determination unit 180 determines whether or not there is an unlabeled pixel among pixels of the images, and if there is an unlabeled pixel, causes repeated execution of training performed by the representation learning unit 110, extraction of feature vectors performed by the feature value extraction unit 130, estimation performed by the positive example distribution estimation unit 150, and labeling performed by the pseudo label giving unit 170.

Specifically, the determination unit 180 determines whether or not there is an unlabeled pixel among pixels of the images stored in the image set storage unit 100.

If there is an unlabeled pixel, the determination unit 180 instructs the representation learning unit 110 to again perform training, the representation learning unit 110 further performs training by using new labels, and extraction of feature vectors performed by the feature value extraction unit 130, estimation performed by the positive example distribution estimation unit 150, and labeling performed by the pseudo label giving unit 170 are repeated. As a result of this procedure being repeated until all pixels are labeled, a label set in which all pixels are labeled can be obtained.

On the other hand, if there is no unlabeled pixel, the processing ends.

If the processing has ended, each pixel included in the images is labeled with the positive example label or the negative example label as shown in the lower row in FIG. 2, for example. Therefore, it is possible to extract the target region of image recognition performed by the image recognizer based on pixels labeled with the positive example label in the images. Also, a feature extraction model and a distribution of feature vectors of pixels labeled with the positive example label are obtained as the image recognizer from a result of training repeatedly performed until each pixel is labeled with the positive example label or the negative example label.

In a case where labels are estimated with respect to another image, it is possible to again train the image recognizer by using the label set of the images that are stored in the image set storage unit 100 and in which all pixels are labeled, and it is also possible to identify labels of pixels by using the trained feature extraction model and the likelihood with respect to the distribution of feature vectors of pixels labeled with the positive example.

For example, in the case of the unlabeled image shown on the right in the upper row in FIG. 2, first, feature vectors can be extracted by the feature value extraction unit 130 by using the trained feature extraction model stored in the feature extraction model storage unit 120 and labels can be given to all pixels included in the image by the pseudo label giving unit 170 to extract the target region.

<Functions of Image Recognizer Training Device According to Embodiment of the Invention>

Figure 3:
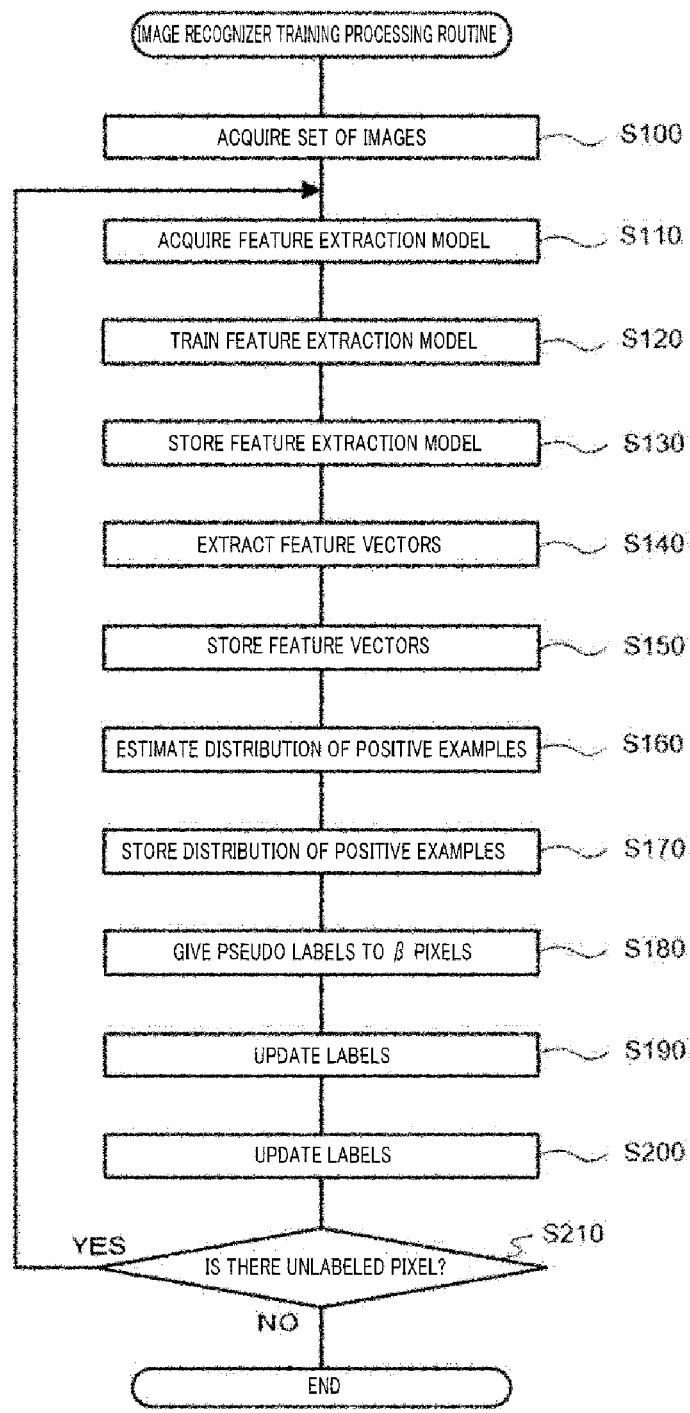
FIG. 3 is a flowchart showing an image recognizer training processing routine of the image recognizer training device according to an embodiment of the present invention.

FIG. 3 is a flowchart showing an image recognizer training processing routine according to the embodiment of the present invention.

The image recognizer training processing routine shown in FIG. 3 is executed in the image recognizer training device 10.

First, in step S100, a set of images that include an image including pixels each labeled with the positive example label or the negative example label and an image including unlabeled pixels is acquired from the image set storage unit 100.

Next, in step S110, the representation learning unit 110 acquires a feature representation model stored in the feature extraction model storage unit 120.

In step S120, the representation learning unit 110 trains the feature representation model for extracting feature vectors of the pixels such that the objective function of the above Expression (7) expressed as a function including the following values is minimized. The values are based on the set of images that include an image including pixels each labeled with the positive example label or the negative example label and an image including unlabeled pixels. A first value of the values is based on a difference between a distance between feature vectors of pixels labeled with the positive example label and a distance between a feature vector of a pixel labeled with the positive example label and a feature vector of an unlabeled pixel. A second value of the values is based on a difference between a distance between a feature vector of a pixel labeled with the positive example label and a feature vector of an unlabeled pixel and a distance between a feature vector of a pixel labeled with the positive example label and a feature vector of a pixel labeled with the negative example label.

In step S130, the representation learning unit 110 stores the trained feature extraction model in the feature extraction model storage unit 120.

In step S140, the feature value extraction unit 130 extracts feature vectors of a plurality of pixels included in each image of the set of images based on the feature representation model trained in the above step S120.

In step S150, the feature value extraction unit 130 stores the extracted feature vectors of the plurality of pixels included in the images in the feature vector set storage unit 140.

In step S160, the positive example distribution estimation unit 150 estimates a normal distribution of feature vectors that are extracted in the above step S140 with respect to pixels labeled with the positive example label.

In step S170, the positive example distribution estimation unit 150 stores an estimated average value $\mu_P$ and an estimated covariance matrix $\Sigma_P$ in the positive example distribution storage unit 160.

In step S180, the pseudo label giving unit 170 calculates, with respect to each unlabeled pixel, the likelihood that the pixel is a positive example based on the normal distribution estimated in the above step S160, and gives the positive example label to pixels, the number of which is the first sample number determined in advance, in descending order of the likelihood and gives the negative example label to pixels, the number of which is the second sample number determined in advance, in ascending order of the likelihood.

In step S190, the pseudo label giving unit 170 updates labels with respect to unlabeled pixels stored in the image set storage unit 100.

In step S200, the determination unit 180 determines whether or not there is an unlabeled pixel among pixels of each image of the set of images.

If there is an unlabeled pixel (YES in the above step S200), the routine returns to step S110 and the processing in the above steps S110 to S200 is repeated.

On the other hand, if there is no unlabeled pixel (NO in the above step S200), the processing ends.

As described above, according to the image recognizer training device of the embodiment of the present invention, a feature representation model for extracting feature vectors of pixels is trained such that an objective function expressed as a function including the following values is minimized. In a case where there are unlabeled pixels among pixels of an image, the values are based on a set of images that include an image including pixels each labeled with the positive example label or the negative example label and an image including unlabeled pixels. A first value of the values is based on a difference between a distance between feature vectors of pixels labeled with the positive example label and a distance between a feature vector of a pixel labeled with the positive example label and a feature vector of an unlabeled pixel. A second value of the values is based on a difference between a distance between a feature vector of a pixel labeled with the positive example label and a feature vector of an unlabeled pixel and a distance between a feature vector of a pixel labeled with the positive example label and a feature vector of a pixel labeled with the negative example label. Furthermore, according to the image recognizer training device of the embodiment of the present invention, with respect to each unlabeled pixel, the likelihood that the pixel is a positive example is calculated based on a distribution of feature vectors of pixels labeled with the positive example label, the feature vectors being extracted with respect to a plurality of pixels included in the images. Furthermore, according to the image recognizer training device of the embodiment of the present invention, the positive example label is given to pixels, the number of which is the first sample number determined in advance, in descending order of the likelihood, and the negative example label is given to pixels, the number of which is the second sample number determined in advance, in ascending order of the likelihood, and as a result of this being repeated, an image recognizer can be trained by efficiently using training data that does not include label information.

Note that the present invention is not limited to the above embodiment, and various alterations and applications can be made within a scope not departing from the gist of the invention.

<Extension to Multi-Class Problem>

In the above-described embodiment, the problem is set to a two-class problem in which only positive examples and negative examples appear, but a similar approach can also be applied to multi-class problems involving three or more classes.

For example, a method for applying the present invention to a problem of identifying a plurality of positive example classes and one negative example class (another class with no definite meaning) will be described.

In this case, each positive example class can serve as the anchor, and therefore, the above-described objective function $L_{PN}$ needs to be minimized with respect to each positive example class. When a set of pixels of the i-th positive example class is represented by $P_i$ and an objective function of Triplet Loss is represented by $L(A,P,N)$, where A represents a set of anchors, P represents a set of positive examples, and N represents a set of negative examples, the objective function of the multi-class problem is expressed by the following Expression (9).

[Formula 8]

$$L_{multi-PN} = \sum_{i=1}^{C_P} L\left(P_i, P_i, N \cup \bigcup_{j \neq i} P_j\right) \quad (9)$$

Here, $C_P$ represents the number of positive example classes.

When pixels for which labels are unknown are taken into consideration, an expression similar to that of the case of the two-class problem holds with respect to each class, and is expressed by the following Expression (10).

[Formula 9]

$$L\left(P_i, P_i, N \cup \bigcup_{j \neq i} P_j\right) = L(P_i, P_i U) + L\left(P_i, U, N \cup \bigcup_{j \neq i} P_j\right) - \alpha \quad (10)$$

Based on this expression, an objective function weighted with γ similarly to the case of the two-class problem is expressed by the following Expression (11).

[Formula 10]

$$L_{multi-PNU} = \sum_{i=1}^{C_P} \left[ \gamma L\left(P_i, P_i, N \cup \bigcup_{j \neq i} P_j\right) + (1-\gamma)\left(L(P_i, P_i, U) + L\left(P_i, U, N \cup \bigcup_{j \neq i} P_j\right) - \alpha\right) \right] \quad (11)$$

However, this transformation of the expression is based on an assumption that pixels U for which labels are unknown are obtained from the same distribution as labeled pixels, and therefore it is necessary to make the ratio of the number of labeled pixels of each class match the ratio of the number of pixels belonging to the class that are included in the pixels U for which labels are unknown.

It is desirable to estimate or assume the ratio of the label of each class included in the pixels U for which labels are unknown by using some method, and give pseudo labels while adjusting the number of labeled pixels so as to match the ratio.

As described above, in a case in which the present invention is extended to a multi-class problem, the representation learning unit 110 trains a feature representation model for extracting feature vectors of pixels such that the objective function expressed by the above Expression (11) is minimized.

The positive example distribution estimation unit 150 estimates, with respect to each positive example class, a normal distribution of feature vectors that are extracted by the feature value extraction unit 130 with respect to pixels labeled with a positive example label of the positive example class.

With respect to each positive example class, the pseudo label giving unit 170 calculates, with respect to each unlabeled pixel, the likelihood that the pixel is a positive example based on the normal distribution of the positive example class estimated by the positive example distribution estimation unit 150 and the feature vector of the unlabeled pixel. Furthermore, the pseudo label giving unit 170 gives the positive example label of the positive example class to pixels, the number of which is a first sample number determined in advance, in descending order of the likelihood. Also, the pseudo label giving unit 170 gives the negative example label to pixels, the number of which is a second sample number determined in advance, in ascending order of the sum of the likelihood regarding respective positive example classes.

Other configurations of the image recognizer training device 10 are the same as those in the case of the two-class problem.

<Extension to Multimodal Problem>

The present invention is also applicable to multimodal data that includes a plurality of types of input data with respect to the same label.

In this case, in the training performed by the representation learning unit 110, a feature representation model for extracting feature vectors of pixels is trained for each modality such that the objective function of the above Expression (7) is minimized. Furthermore, in the training performed by the representation learning unit 110, feature vectors are obtained for each modality by using the feature representation model of the modality and are combined between modalities, and a normal distribution of combined vectors is estimated by the positive example distribution estimation unit 150 by using combined vectors obtained by combining feature vectors. The pseudo label giving unit 170 can give the positive example label and the negative example label based on combined vectors of unlabeled pixels.

<Extension to Problems Other than Image Region Extraction>

An image region extraction problem is described in the above embodiment, but the present invention is not limited to this problem, and can also be applied to problems of estimating discrete labels with respect to input data in general, such as image identification and abnormality detection.

Also, an embodiment in which a program is installed in advance is described in the specification of the present application, but it is also possible to provide the program in a state of being stored in a computer-readable recording medium.

REFERENCE SIGNS LIST

- 10 Image recognizer training device
- 100 Image set storage unit
- 110 Representation learning unit
- 120 Feature extraction model storage unit
- 130 Feature value extraction unit
- 140 Feature vector set storage unit
- 150 Positive example distribution estimation unit
- 160 Positive example distribution storage unit
- 170 Pseudo label giving unit
- 180 Determination unit

The invention claimed is:

1. An image recognizer training device comprising a processor configured to execute operations, comprising:

training a feature representation model based on a set of images that include an image including pixels each labeled with a positive example label or a negative example label and an image including unlabeled pixels, the feature representation model being a model for extracting feature vectors of the pixels and trained such that an objective function is minimized, the objective function being expressed as a function that includes a value that is based on a difference between a distance between feature vectors of pixels labeled with the positive example label and a distance between a feature vector of a pixel labeled with the positive example label and a feature vector of an unlabeled pixel, and a value that is based on a difference between a distance between a feature vector of a pixel labeled with the positive example label and a feature vector of an unlabeled pixel and a distance between a feature vector of a pixel labeled with the positive example label and a feature vector of a pixel labeled with the negative example label;

extracting feature vectors of a plurality of pixels included in the images based on the feature representation model trained;

estimating a distribution of feature vectors that are extracted with respect to pixels labeled with the positive example label;

calculating, with respect to each unlabeled pixel, a likelihood that the pixel is a positive example based on the distribution estimated and give the positive example label to pixels, a number of which is a first sample number determined in advance, in descending order of the likelihood and give the negative example label to pixels, the number of which is a second sample number determined in advance, in ascending order of the likelihood; and determining whether or not there is an unlabeled pixel among pixels of the images, and if there is an unlabeled pixel, causes repeated execution of training, extraction of feature vectors, estimation, and labeling, wherein for each unlabeled pixel, the likelihood of the unlabeled pixel being a positive example is labeled based on a normal distribution and the feature vector of the unlabeled pixel.

2. The image recognizer training device according to claim 1, wherein the objective function is expressed as a function that further includes a value that is based on a difference between a distance between feature vectors of pixels labeled with the same label and a distance between feature vectors of pixels labeled with different labels.

3. The image recognizer training device according to claim 1, wherein the feature representation model includes a convolutional neural network.

4. The image recognizer training device according to claim 1, wherein the objective function is associated with Triplet Loss.

5. An image recognizer training method comprising:

training a feature representation model based on a set of images that include an image including pixels each labeled with a positive example label or a negative example label and an image including unlabeled pixels, the feature representation model being a model for extracting feature vectors of the pixels and trained such that an objective function is minimized, the objective function being expressed as a function that includes a value that is based on a difference between a distance between feature vectors of pixels labeled with the positive example label and a distance between a feature vector of a pixel labeled with the positive example label and a feature vector of an unlabeled pixel, and a value that is based on a difference between a distance between a feature vector of a pixel labeled with the positive example label and a feature vector of an unlabeled pixel and a distance between a feature vector of a pixel labeled with the positive example label and a feature vector of a pixel labeled with the negative example label;

extracting feature vectors of a plurality of pixels included in the images based on the feature representation model trained;

estimating a distribution of feature vectors that are extracted with respect to pixels labeled with the positive example label;

calculating with respect to each unlabeled pixel, a likelihood that the pixel is a positive example based on the distribution estimated and giving the positive example label to pixels, a number of which is a first sample number determined in advance, in descending order of the likelihood and giving the negative example label to pixels, the number of which is a second sample number determined in advance, in ascending order of the likelihood; and determining whether or not there is an unlabeled pixel among pixels of the images, and if there is an unlabeled pixel, causing repeated execution of training, extraction of feature vectors, estimation, and labeling, wherein for each unlabeled pixel, the likelihood of the unlabeled pixel being positive example is labeled based on a normal distribution and the feature vector of the unlabeled pixel.

6. The image recognizer training method according to claim 5, wherein the objective function is expressed as a function that further includes a value that is based on a difference between a distance between feature vectors of pixels labeled with the same label and a distance between feature vectors of pixels labeled with different labels.

7. The image recognizer training method according to claim 5, wherein the feature representation model includes a convolutional neural network.

8. The image recognizer training method according to claim 5, wherein the objective function is associated with Triplet Loss.

9. A computer-readable non-transitory recording medium storing computer-executable instructions that when executed by a processor cause a computer system to:

training a feature representation model based on a set of images that include an image including pixels each labeled with a positive example label or a negative example label and an image including unlabeled pixels, the feature representation model being a model for extracting feature vectors of the pixels and trained such that an objective function is minimized, the objective function being expressed as a function that includes a value that is based on a difference between a distance between feature vectors of pixels labeled with the positive example label and a distance between a feature vector of a pixel labeled with the positive example label and a feature vector of an unlabeled pixel, and a value that is based on a difference between a distance between a feature vector of a pixel labeled with the positive example label and a feature vector of an unlabeled pixel and a distance between a feature vector of a pixel labeled with the positive example label and a feature vector of a pixel labeled with the negative example label;

extracting extract feature vectors of a plurality of pixels included in the images based on the feature representation model trained by the representation learner;

estimating a distribution of feature vectors that are extracted with respect to pixels labeled with the positive example label;

determining, with respect to each unlabeled pixel, a likelihood that the pixel is a positive example based on the estimated distribution and give the positive example label to pixels, a number of which is a first sample number determined in advance, in descending order of the likelihood and give the negative example label to pixels, the number of which is a second sample number determined in advance, in ascending order of the likelihood; and determining whether or not there is an unlabeled pixel among pixels of the images, and if there is an unlabeled pixel, causes repeated execution of training, extraction of feature vectors, estimation, and labeling, wherein for each unlabeled pixel, the likelihood of the unlabeled pixel being a positive example is labeled based on a normal distribution and the feature vector of the unlabeled pixel.

10. The computer-readable non-transitory recording medium of claim 9, wherein the objective function is expressed as a function that further includes a value that is based on a difference between a distance between feature vectors of pixels labeled with the same label and a distance between feature vectors of pixels labeled with different labels.

11. The computer-readable non-transitory recording medium of claim 9, wherein the feature representation model includes a convolutional neural network.

12. The computer-readable non-transitory recording medium of claim 9, wherein the objective function is associated with Triplet Loss.

* * * * *